(12) United States Patent
Yoon et al.

(10) Patent No.: US 12,187,314 B2
(45) Date of Patent: Jan. 7, 2025

(54) OPERATIONAL RESPONSE MODEL BASED ON OPERATIONAL PARAMETERS

(71) Applicant: Waymo LLC, Mountain View, CA (US)

(72) Inventors: Kevin Yoon, Oakland, CA (US); Vadim Butakov, Hayward, CA (US)

(73) Assignee: Waymo LLC, Mountain View, CA (US)

( * ) Notice: Subject to any disclaimer, the term of this patent is extended or adjusted under 35 U.S.C. 154(b) by 229 days.

(21) Appl. No.: 17/457,128

(22) Filed: Dec. 1, 2021

(65) Prior Publication Data

US 2023/0166765 A1 Jun. 1, 2023

(51) Int. Cl.
*B60W 60/00* (2020.01)
*B60W 10/04* (2006.01)
(Continued)

(52) U.S. Cl.
CPC ........ *B60W 60/0013* (2020.02); *B60W 10/04* (2013.01); *B60W 10/18* (2013.01);
(Continued)

(58) Field of Classification Search
None
See application file for complete search history.

(56) References Cited

U.S. PATENT DOCUMENTS 9,616,897 B2 * 4/2017 Powers ............. G01C 21/3602
9,738,284 B2 8/2017 Pallett
(Continued)

FOREIGN PATENT DOCUMENTS

CN 109324609 A 2/2019
CN 111907530 A 11/2020
(Continued)

OTHER PUBLICATIONS

R. Dey, S. Das and P. B. Vora, "Design and Trajectory Estimation of Dynamic Motion Model," 2018, IEEE, International Conference on Advances in Computing, Communications and Informatics (ICACCI), Bangalore, India, 2018, pp. 1334-1340, doi: 10.1109/ICACCI.2018.8554511. (Year: 2018).*
(Continued)

*Primary Examiner* — Jaime Figueroa
*Assistant Examiner* — Atticus A Cameron
(74) *Attorney, Agent, or Firm* — MCDONNELL BOEHNEN HULBERT & BERGHOFF LLP

(57) ABSTRACT

An autonomous vehicle is provided that includes one or more sensors coupled to the autonomous vehicle, and a computing device configured to: (i) receive, from the one or more sensors, operational data related to an operation of the autonomous vehicle, (ii) receive geographical data related to an anticipated route of the autonomous vehicle, (iii) generate, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other, and (iv) responsively execute, based on the operational response model, an autonomous control strategy comprising one or more adjustments to the operation of the vehicle within the respective operational constraints.

26 Claims, 10 Drawing Sheets

(51) Int. Cl.
*B60W 10/18* (2012.01)
*B60W 50/00* (2006.01)

(52) U.S. Cl.
CPC . *B60W 2520/105* (2013.01); *B60W 2520/125* (2013.01); *B60W 2520/16* (2013.01); *B60W 2520/18* (2013.01); *B60W 2530/10* (2013.01); *B60W 2530/205* (2020.02); *B60W 2555/20* (2020.02)

(56) References Cited

U.S. PATENT DOCUMENTS

| | | | |
|---|---|---|---|
| 10,202,112 B2 | 2/2019 | Gaither | |
| 10,365,653 B2* | 7/2019 | Haghighat | B60W 10/20 |
| 2010/0038158 A1* | 2/2010 | Whitney | B60K 6/485 |
| | | | 180/65.265 |
| 2015/0251664 A1* | 9/2015 | Zagorski | B60W 30/02 |
| | | | 701/1 |
| 2016/0039480 A1* | 2/2016 | Pichlmaier | G07C 5/085 |
| | | | 180/233 |
| 2017/0072955 A1 | 3/2017 | Ediger | |
| 2020/0262468 A1 | 8/2020 | George | |
| 2020/0346646 A1 | 11/2020 | Lee | |
| 2020/0346665 A1* | 11/2020 | Araújo et al. | A61B 5/163 |
| 2021/0221379 A1 | 7/2021 | Sato | |
| 2021/0323573 A1* | 10/2021 | Gogna | G01C 21/3407 |

FOREIGN PATENT DOCUMENTS

| | | |
|---|---|---|
| DE | 102019124339 B3 | 9/2020 |
| WO | 2021014489 A1 | 1/2021 |

OTHER PUBLICATIONS

Dey, Rastri; Das, Soumyo; Vora, Prashantkumar; 'Design and Trajectory Estimation of Dynamic Motion Model', 2018, IEEE, p. 1334-1340 (Year: 2018).*

Bae et al., "Self-Driving like a Human driver instead of a Robocar: Personalized comfortable driving experience for autonomous vehicles", Neural Information Processing Systems, https://ml4ad.github.io/files/papers/Self-Driving%20like%20a%20Human%20driver%20instead%20of%20a%20Robocar:%20Personalized%20comfortable%20driving%20experience%20for%20autonomous%20vehicles.pdf (2019).

Isa et al., "Acceleration Response in Determining Vehicles Objective Driveability Assessment", Applied Mechanics and Materials, 663:121-126, https://www.scientific.net/AMM.663.121 (2014).

* cited by examiner

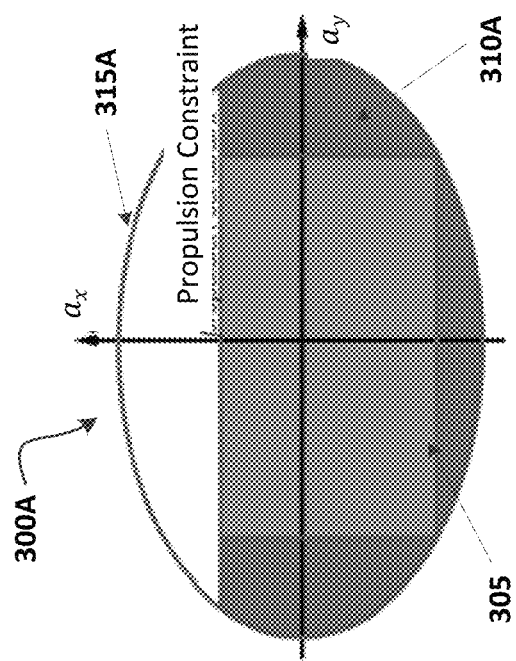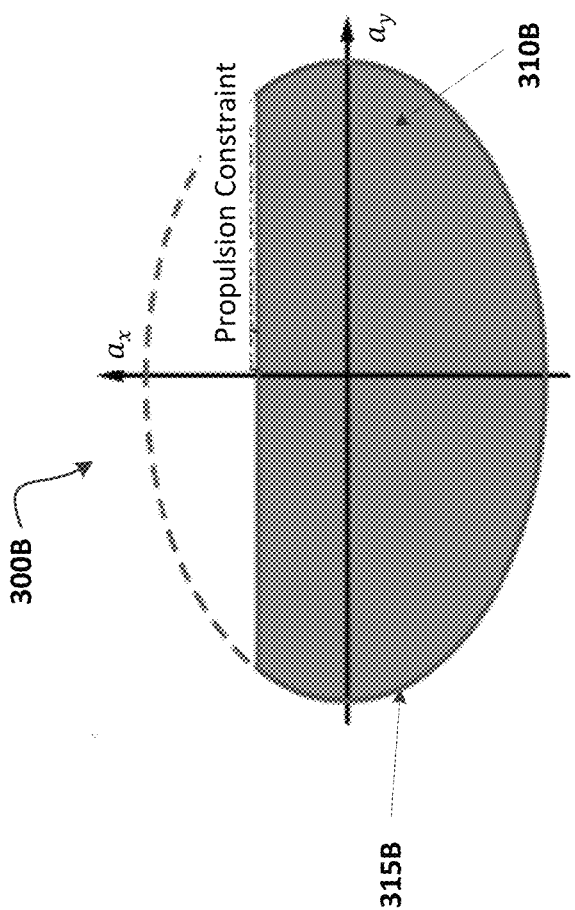

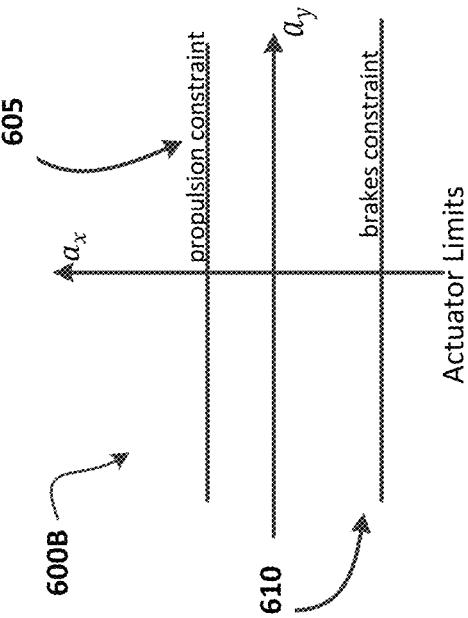
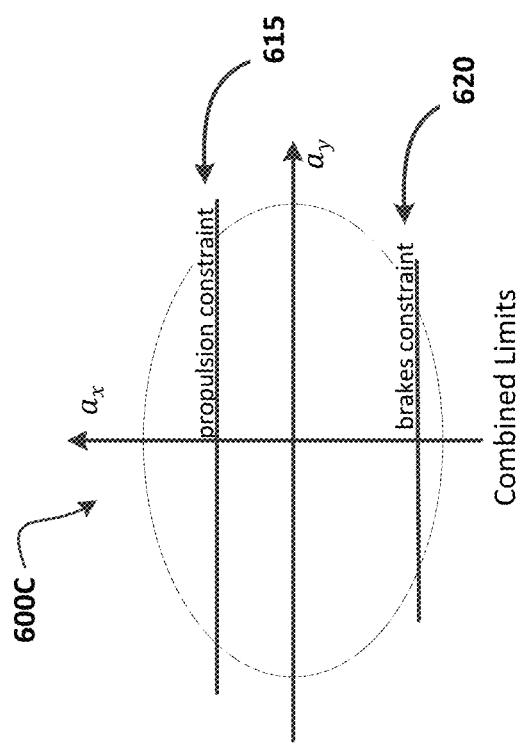
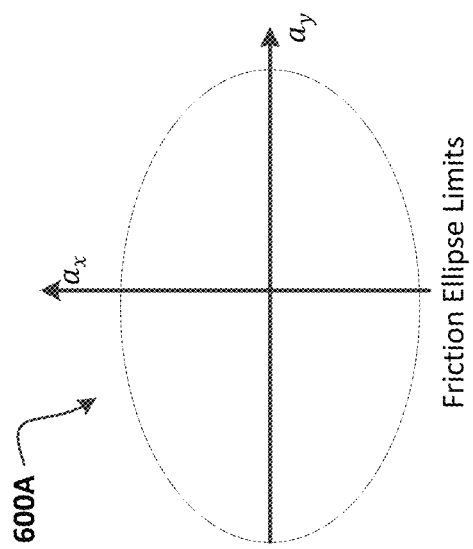

OPERATIONAL RESPONSE MODEL BASED ON OPERATIONAL PARAMETERS

BACKGROUND

A vehicle may be equipped with a variety of sensors to facilitate safe operation of the vehicle in a surrounding environment. Example sensors may include position sensors (e.g., Global Positioning System, etc.), inertial sensors (e.g., gyroscopes, accelerometers, etc.), scanning sensors (e.g., LIDARs, RADARs, Cameras, etc.), among other types of sensors. One or more operable parameters of the vehicle may dynamically change during an operation of the vehicle. Real-time adjustments may be made to the operation of the vehicle to respond to such dynamic changes in the one or more operable parameters.

SUMMARY

Examples relate to the development and implementation of an operational response model for determining operational parameters for autonomous vehicles, such as trucks and other types of vehicles. The operational response model may enhance the performance of an autonomous vehicle by adjusting longitudinal limits (for acceleration and braking) based on the amount of lateral acceleration that the vehicle experiences, and vice versa. In the elliptical model, the longitudinal and lateral acceleration limits are coupled. An alternative approach may include a rectangle model, where the longitudinal and lateral acceleration limits are independent. However, because they are independent, the limits would have to be chosen conservatively such that the rectangle fits within the elliptical limits of traction. The coupled feature of the ellipse limits represents the capabilities of the vehicle more accurately, and therefore enables a larger operational range, which in turn improves performance and safety.

At any given time, for a given route, there may be a plurality of operational response models at various scales and translations along a planned trajectory. For example, the operational response models can be based on expected future states of the vehicle and the road ahead. For example, different segments of the route can be mapped to different operational response models.

The operational response model can be used to adjust operational parameters when the payload and/or environment of the vehicle changes. For example, a wet road may reduce the size of the acceleration response model since safe operation of the autonomous truck may require a reduction in acceleration and braking limits. Also, for example, in a passenger vehicle, comfort settings may require a reduction in acceleration and braking limits. In addition, the operational response model can factor different road conditions and may be displayed as a graphical user interface that enables an operator to view current performance of the autonomous vehicle relative to optimal performance levels.

In a first example embodiment, an autonomous vehicle is provided that includes one or more sensors coupled to the autonomous vehicle; and a computing device configured to (i) receive, from the one or more sensors, operational data related to an operation of the autonomous vehicle, (ii) receive geographical data related to an anticipated route of the autonomous vehicle, (iii) generate, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other, and (iv) responsively execute, based on the operational response model, an autonomous control strategy comprising one or more adjustments to the operation of the vehicle within the respective operational constraints.

In a second example embodiment, a method is provided that includes receiving, at a computing device and from one or more sensors coupled to an autonomous vehicle, data related to an operation of the autonomous vehicle. The method also includes receiving geographical data related to an anticipated route of the autonomous vehicle. The method further includes generating, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other. The method additionally includes, responsively executing, based on the operational response model, an autonomous control strategy comprising one or more adjustments to the operation of the vehicle within the respective operational constraints.

In a third example embodiment, a system is provided that includes an autonomous vehicle, one or more sensors coupled to the autonomous vehicle, and a computing device configured to (i) receive, from the one or more sensors, operational data related to an operation of the autonomous vehicle, (ii) receive geographical data related to an anticipated route of the autonomous vehicle, (iii) generate, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other, and (iv) responsively execute, based on the operational response model, an autonomous control strategy comprising one or more adjustments to the operation of the vehicle within the respective operational constraints.

In a fourth example embodiment, a non-transitory computer readable storage medium is provided having stored thereon instructions that, when executed by a computing device, cause the computing device to perform operations. The operations include receiving, at a computing device and from one or more sensors coupled to an autonomous vehicle, data related to an operation of the autonomous vehicle. The operations also include receiving geographical data related to an anticipated route of the autonomous vehicle. The operations further include generating, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other. The operations additionally include, responsively executing, based on the operational response model, an autonomous control strategy comprising one or more adjustments to the operation of the vehicle within the respective operational constraints.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 3A and 3B illustrate a comparison of a rectangular model and an elliptical model, in accordance with example embodiments.

FIG. 6A illustrates an example operational response model with propulsion and brake constraints, in accordance with example embodiments.

FIG. 6B illustrates an example operational response model with propulsion and brake constraints, in accordance with example embodiments.

FIG. 6C illustrates an example operational response model with propulsion and brake constraints, in accordance with example embodiments.

DETAILED DESCRIPTION

Figure 1:
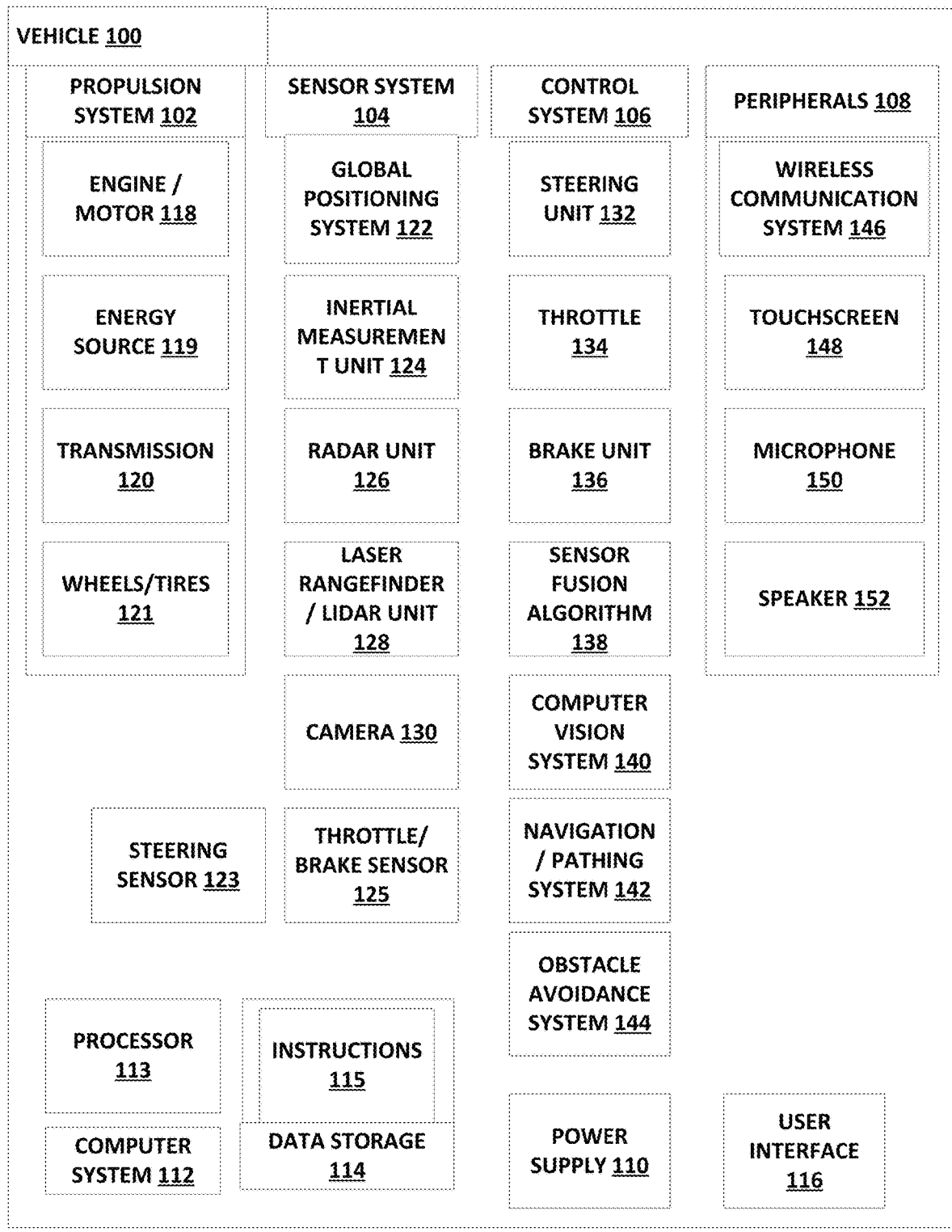
FIG. 1 illustrates a block diagram of a vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Examples relate to a development and implementation of an operational response model for determining operational parameters for autonomous vehicles, such as trucks and other types of vehicles. The operational response model enables increasing the performance of an autonomous vehicle by adjusting longitudinal limits (for acceleration and braking) based on an amount of lateral acceleration that the vehicle experiences, and vice versa. Alternative approaches can include using a rectangle model. However, the rectangle can be fitted into an ellipse, which has more area, and can therefore broaden a range of feasible operational parameters. Also, in the elliptical model, the longitudinal and lateral acceleration limits may be coupled, whereas in the rectangle model, the longitudinal and lateral acceleration limits are generally treated independently. The coupled feature of the limits represents the capabilities of the vehicle more accurately, and therefore enables a larger operational range, which in turn improves performance and safety.

Also for example, at any given time, and for a given route, there may be a plurality of operational response models at various scales and translations along a planned trajectory. For example, the operational response models may be based on expected future states of the vehicle and the road ahead. For example, different segments of the route can be mapped to different operational response models.

In some embodiments, the operational response model may be based on road wetness conditions, road materials, road patterns, and/or a driving speed. In some aspects, longitudinal and lateral curves may be generated to capture such conditions. For example, a group of longitudinal and lateral curves can capture temporal changes in such conditions to capture trends.

The operational response model can also be used to adjust operational parameters when the payload and/or environment of the vehicle changes. For example, a wet road may reduce the size of the operational response model since safe operation of the autonomous truck may require a reduction in acceleration and braking limits. Also, for example, in a passenger vehicle, enhanced comfort settings may call for, for example, a reduction in acceleration and braking limits. In addition, the operational response model can factor different road conditions and may be displayed as a graphical user interface that enables an operator to view current performance of the autonomous vehicle relative to optimal performance levels.

II. EXAMPLE VEHICLE SYSTEMS

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. In some example embodiments, the vehicle may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles. Further, in some embodiments, example systems might not include a vehicle.

By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

Referring now to the figures, FIG. 1 is a functional block diagram illustrating example vehicle 100, which may be configured to operate fully or partially in an autonomous mode. In some examples, vehicle 100 may operate in an autonomous mode by receiving and/or generating control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (which could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber. Some or all of the wheels/tires 121 may be coupled to the transmission 120, and the computer system 112 may be able to receive information about tire pressure, balance and other factors that may impact driving in an autonomous mode.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth.

IMU 124 may have a configuration that uses one or more accelerometers and/or gyroscopes and may sense position and orientation changes of vehicle 100 based on inertial acceleration. For example, IMU 124 may detect a pitch, roll, and/or yaw of the vehicle 100 while vehicle 100 is stationary or in motion. In some embodiments, IMU 124 may include a register that records data from IMU 124 (e.g., an accelerometer), such as the position and orientation changes of vehicle 100 based on inertial acceleration. One or more accelerometers may sense changes in vehicular acceleration, and record each change in a register. The register may make sensor data available to control system 106 and/or computer system 112. Sensor data may then be processed, for example, by utilizing a sensor fusion algorithm 138.

In some embodiments, IMU 124 may be sensitive to environmental conditions such as temperature, altitude, barometric pressure, and so forth.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation. In some embodiments, sensor fusion algorithm 138 may utilize one or more operational response models to execute driving strategy.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. In some aspects, navigation/pathing system 142 may store map information (e.g., highly detailed maps that can be used for navigation). For example, the maps may identify the shape and elevation of roadways, lane markers, intersections, speed limits, cross-walks, merging lanes, road banks, grades, traffic signal devices, buildings, signs, vegetation, real-time traffic information, and so forth. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. In some embodiments, computer system 112 may receive, from one or more sensors, operational data related to an operation of the autonomous vehicle. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Also, for example, computer system 112 may utilize input from sensor system 104 (e.g., one or more accelerometers in IMU 124) in order to estimate mass properties for a payload to build a confidence that can be used to determine navigation strategy by vehicle 100 pulling the payload. For example, computer system 112 may make a determination about various objects based on a change in acceleration in conjunction with timing data obtained from the lasers or other optical sensors configured to sense objects in a field of view of vehicle 100.

In some embodiments, computer system 112 may receive geographical data related to an anticipated route of the autonomous vehicle. For example, navigation/pathing system 142 may store map information (e.g., highly detailed maps that can be used for navigation). For example, the combination of GPS 122 and the features recognized by computer vision system 140 may be used with map data stored in data storage 114 to determine specific road parameters. Further, radar 126 may also provide information about the surroundings of the vehicle.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
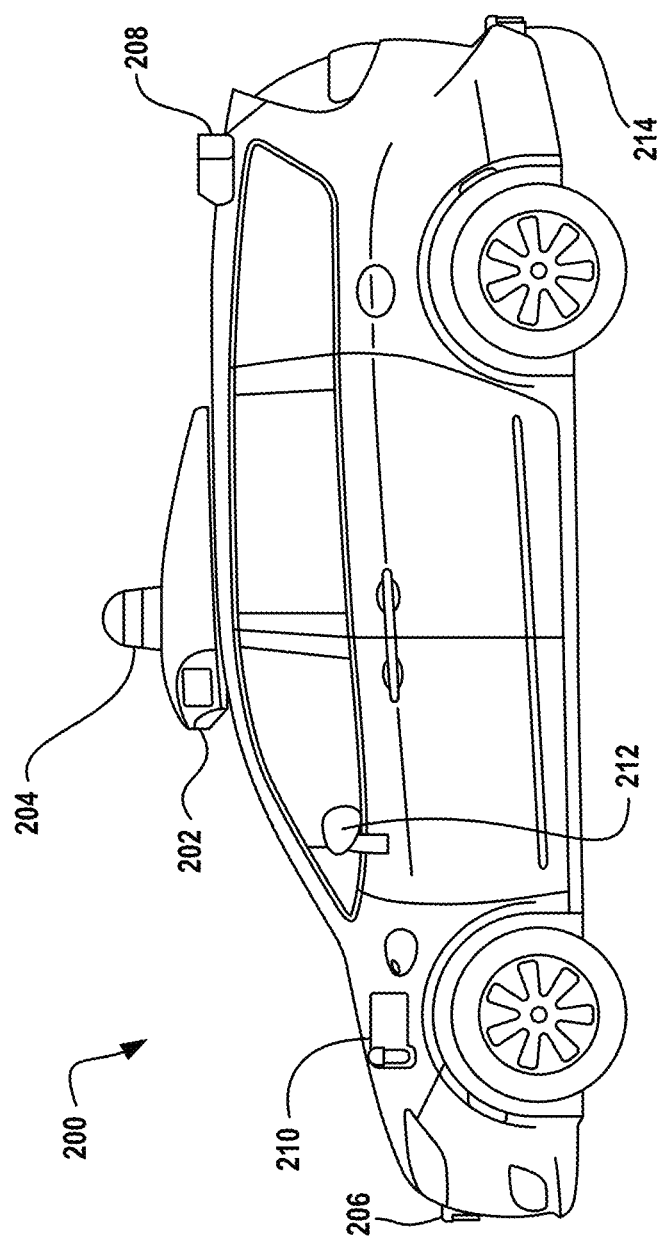
FIG. 2A illustrates a physical configuration of a vehicle, in accordance with example embodiments.

FIG. 2A illustrates a physical configuration of a vehicle, in accordance with example embodiments. In some aspects, FIG. 2A shows an example vehicle 200 that can include some or all of the functions described in connection with vehicle 100 in reference to FIG. 1. Although vehicle 200 is illustrated in FIG. 2A as a van for illustrative purposes, the present disclosure is not so limited. For instance, the vehicle 200 can represent a truck, a car, a semi-trailer truck, a motorcycle, a golf cart, an off-road vehicle, a farm vehicle, etc. that can be configured to pull a trailer with a payload. The trailer may be any trailer configured to carry a payload. Also, for example, the trailer may be equipped with one or more of in-trailer radars, LIDARS, or cameras for visual inspection of the interior of the trailer. In some embodiments, the trailer may be permanently attached to vehicle 200, or may be detachable from vehicle 200. Also, for example, the payload can be any form of payload to be transported by vehicle 200. For a class A truck, a trailer is generally configured with brake actuation. There are also examples of steerable trailers. Trailers may also be configured to have brakes controlled from a vehicle (e.g., by a human driver in a truck).

The example vehicle 200 includes a sensor unit 202, a first LIDAR unit 204, a second LIDAR unit 206, a radar unit 208, a LIDAR/radar unit 210, and two additional locations 212, 214 at which an accelerometer, a gyroscope, a radar unit, LIDAR unit, laser rangefinder unit, and/or other type of sensor or sensor(s) could be located on the vehicle 200. The LIDAR/radar unit 210 can take the form of a LIDAR unit, a radar unit, or both.

Furthermore, the example vehicle 200 can include any of the components described in connection with vehicle 100 of FIG. 1. The radar unit 208, and/or the LIDAR units 204, 206 can actively scan the surrounding environment for the presence of potential obstacles and can be similar to the radar 126 and/or laser rangefinder/LIDAR 128 in the vehicle 100. As another example, an accelerometer at location 212 can be similar to the accelerometer included in IMU 124 in the vehicle 100.

Sensor unit 202 may be mounted atop the vehicle 200 and include one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Furthermore, each sensor of sensor unit 202 can be configured to be moved or scanned independently of other sensors of sensor unit 202.

Although not shown in FIG. 2A, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. In some embodiments, the sensor may be one or more of: an inertial measurement unit, a laser measurement unit for trailer articulation, a roll sensor to measure a body roll, a pitch sensor to measure pitch data, and a pressure sensor on a suspension of the trailer to measure a response of the trailer suspension.

To facilitate this, the control system may receive, from the one or more sensors coupled to an autonomous vehicle, operational data related to an operation of the autonomous vehicle. The control system may be configured to receive geographical data related to an anticipated route of the autonomous vehicle. The control system may be further configured to generate, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other. The control system may be additionally configured to responsively execute, based on the operational response model, an autonomous control strategy comprising one or more adjustments to the operation of the vehicle within the respective operational constraints.

Figure 2B:
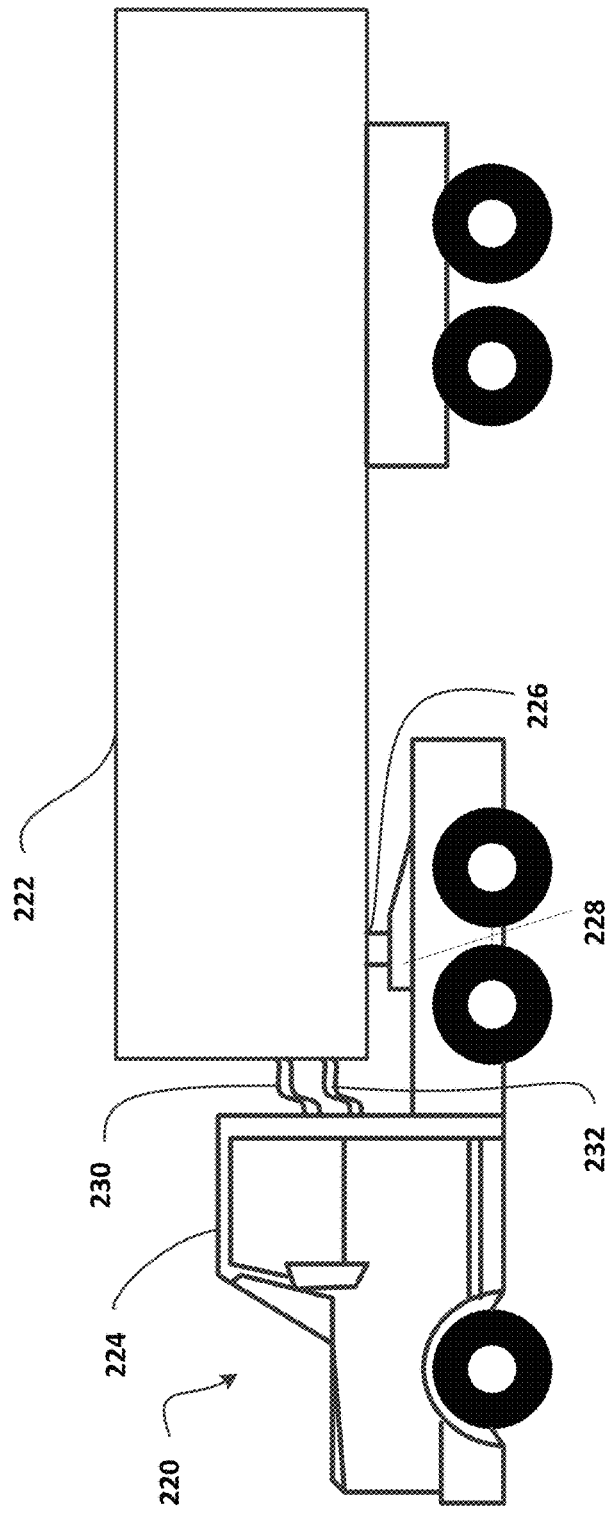
FIGS. 2B and 2C illustrate an example tractor-trailer configuration, in accordance with example embodiments.
Figure 2C:
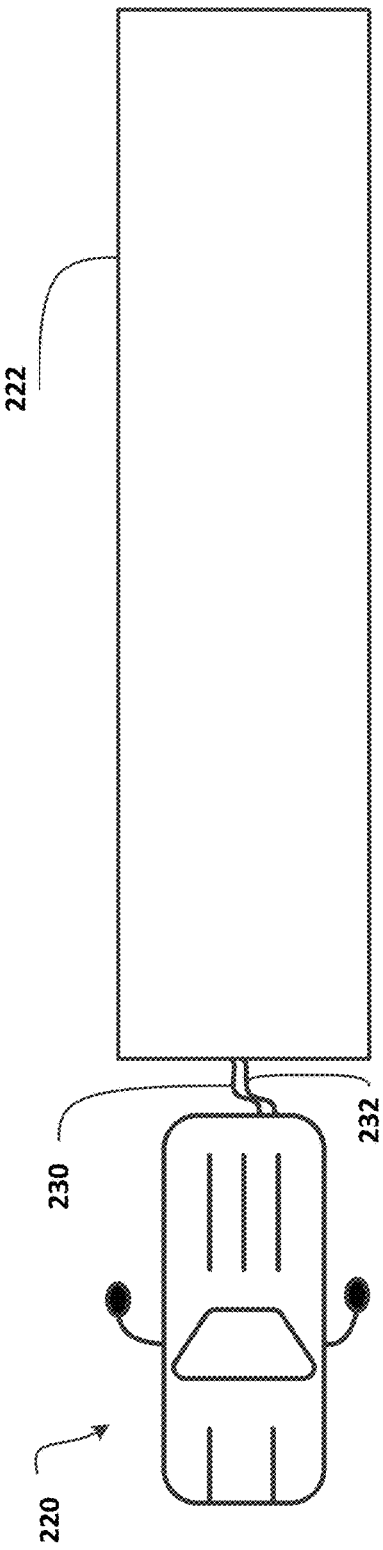

FIGS. 2B and 2C illustrate an example tractor-trailer configuration, in accordance with example embodiments. The tractor-trailer configuration may relate to a tractor-trailer truck. The truck may include, e.g., a single, double or triple trailer, or may be another medium or heavy duty truck such as in commercial weight classes 4 through 8. As shown, the truck includes a tractor unit 220 and a single cargo unit or trailer 222. The trailer 222 may be fully enclosed, open such as a flat bed, or partially open depending on the type of cargo to be transported. The tractor unit 220 includes the engine and steering systems (not shown) and a cab 224 for a driver and any passengers. In a fully autonomous arrangement, the cab 224 may not be equipped with seats or manual driving components, since no person may be necessary.

The trailer 222 includes a hitching point 226. The hitching point 226 is typically formed as a solid steel shaft, which is configured to pivotally attach to the tractor unit 220. In particular, the hitching point 226 attaches to a trailer coupling 228 that is mounted rearward of the cab. For a double or triple tractor-trailer, the second and/or third trailers may have simple hitch connections to the leading trailer. Or, alternatively, according to one aspect of the disclosure, each trailer may have its own hitching point. In this case, at least the first and second trailers could include a trailer coupling type structure arranged to couple to the next trailer.

As shown, connectors 230 and 232 also couple from the tractor unit 220 to the trailer 222. These may include one or more air hoses 230 and one or more electrical conduits 232. The air hose(s) 230 enables the tractor unit 220 to operate the pneumatic brakes of the trailer 222, and the electrical conduit(s) 232 provide power and signals to the brakes and lights of the trailer 222. In an autonomous system, it may be difficult or unfeasible to manually connect the air hoses, electrical conduits and other connectors between the tractor unit 220 and trailer 222.

III. EXAMPLE OPERATIONAL RESPONSE MODELS

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving sensor data. The processing system of the vehicle may alter the control of the vehicle based on sensor data received from the various sensors. In some examples, the vehicle may alter a velocity of the vehicle in response to sensor data from the various sensors. The vehicle may change velocity in order to avoid obstacles, obey traffic laws, etc. When a processing system in the vehicle identifies objects near the vehicle, the vehicle may be able to change velocity, or alter the movement in another way. In some embodiments, computer system 112 may generate an operational response model for an anticipated route and based on the operational data and the geographical data related to the anticipated route. The operational response model may represent respective operational constraints for one or more operational parameters of the autonomous vehicle. For example, the operational parameter may be a lateral acceleration, and the respective operational constraint may be a lateral acceleration limit. As another example, the operational parameter may be a longitudinal acceleration, and the respective operational constraint may be a longitudinal acceleration limit. The values for the one or more operational parameters may be represented along coordinate axes of a geometrical shape. For example, the geometrical shape may be a rectangle, an ellipse, and so forth. For illustrative purposes, two operational parameters are represented in a planar geometrical shape. However, a similar approach may apply to N operational parameters, with N>2, that may be represented along orthogonal axes of a higher N-dimensional geometric shape. In some aspects, the one or more operational parameters may be mutually coupled to each other. The term "mutually coupled" generally means that any change to a first operational constraint of a first operational parameter results in a change to a second operational constraint of a second operational parameter.

FIGS. 3A and 3B illustrate a comparison of a rectangular model and an elliptical model, in according to example embodiments. Generally, longitudinal and lateral acceleration limits are considered independently, based on a friction rectangle 305. Based on friction rectangle 305, regardless of the lateral acceleration exerted on the autonomous vehicle, the longitudinal acceleration capability may remain unchanged, and vice versa. Generally, friction rectangle 305 has been a convenient way to model limits in a route planner where geometry and speed are to be considered separately. For example, lateral acceleration limits are related to the geometry, whereas longitudinal acceleration limits are related to the speed. However, friction rectangle 305 may not accurately capture the physical limits of traction, which may be better represented by an ellipse, where longitudinal limits are reduced as the autonomous vehicle experiences more lateral acceleration.

As illustrated in operational response model 300A, friction rectangle 305 may be approximately inscribed inside an elliptical region 300A that may more accurately represent the traction limits. Friction rectangle limits are generally chosen conservatively because longitudinal and lateral acceleration limits are not considered simultaneously. This may give rise to a tradeoff in underutilized performance capabilities. For example, region 310A in operational response model 300A is outside friction rectangle 305. However, region 310B (corresponding to region 300A) in operational response model 300B is inside elliptical model 315B. The elliptical model representation involving elliptical model 300B enables access to an additional performance region (e.g., including region 310B). Generating a more accurate response model may be significant, especially with factors such as wet roads, increased trailer mass, and/or jackknife risk that may cause the limits to be further reduced.

There are many factors to consider in order to accurately determine a shape and size of an operational response model. Such factors may include friction of a road surface, road pitch and/or grade, mass and center of gravity (CG) of a vehicle and trailer mass, and effects from weight transfer. It may generally be challenging to determine the significance of the effect of each of these factors on the accuracy of an operational response model. In what follows, for illustrative purposes only, an elliptical model may be used to describe an operational response model.

For example, an elementary elliptical model may be defined by two parameters: a longitudinal acceleration parameter, $E_{long}$, represented along a longitudinal half-axis (m/s/s), and a lateral acceleration parameter, $E_{lat}$, represented along a lateral half-axis (m/s/s).

In some embodiments, computer system 112 may responsively execute, based on the operational response model, an autonomous control strategy comprising one or more adjustments to the operation of the vehicle within the respective operational constraints. For example, based on the limits to the lateral and longitudinal acceleration limits, computer system 112 may responsively execute a driving strategy for vehicle 100. In some embodiments, computer system 112 may trigger a change to a driving mode of the autonomous vehicle based on the operational response model. For example, the vehicle may be operating in a fully automated mode (Level 5), and computer system 112 may indicate a change to a Level 3 conditional automation mode.

In some embodiments, a value for a first operational parameter may be determined based on the value of a second operational parameter. For example, computer system 112 may receive, for example, via touchscreen 148, a first operational value of a first operational parameter of the one or more operational parameters. Then, computer system 112 may provide, based on the first operational value and the operational response model, a second operational value of a second operational parameter of the one or more operational parameters. For example, when a value for a lateral acceleration limit is input, computer system 112 may output a value of the longitudinal acceleration limit. In some embodiments, computer system 112 may adjust the respective operational constraints based on a change to a given operational parameter of the one or more operational parameters. For example, based on a change to a lateral acceleration, computer system 112 may use the operational response model to adjust the longitudinal acceleration.

In some embodiments, the one or more operational parameters may include a jerk parameter. The jerk parameter is indicative of a rate of change of acceleration with time. Also, for example, the one or more operational parameters may include a jounce parameter. The jounce parameter is indicative of a rate of change of jerk with time. In some embodiments, the one or more operational parameters may include longitudinal and/or lateral components of the jerk parameter, and/or jounce parameter.

In some embodiments, an operational response model may additionally scale with friction and/or discomfort. Additional and/or alternate factors may have a significant impact on the operational response model, and the model may be updated to account for such factors. However, it may be preferable to update the parameters of an elementary ellipse model to compensate for the effect. Accordingly, in some aspects, a trade off in performance may be preferable to a more complex model.

Friction Scaling

In some embodiments, the operational response model may scale with the surface friction of the road. Surface friction may be a significant dynamic determinant of the ellipse size and may be a natural way to limit acceleration limits in the presence of wet roads. A formula for scaling ellipse based on a coefficient of surface friction, may be determined as:

$$E_{long\text{-}scaled} = E_{long} * \mu$$

$$E_{lat\text{-}scaled} = E_{lat} * \mu \quad \text{(Eqn. 1)}$$

Figure 4:
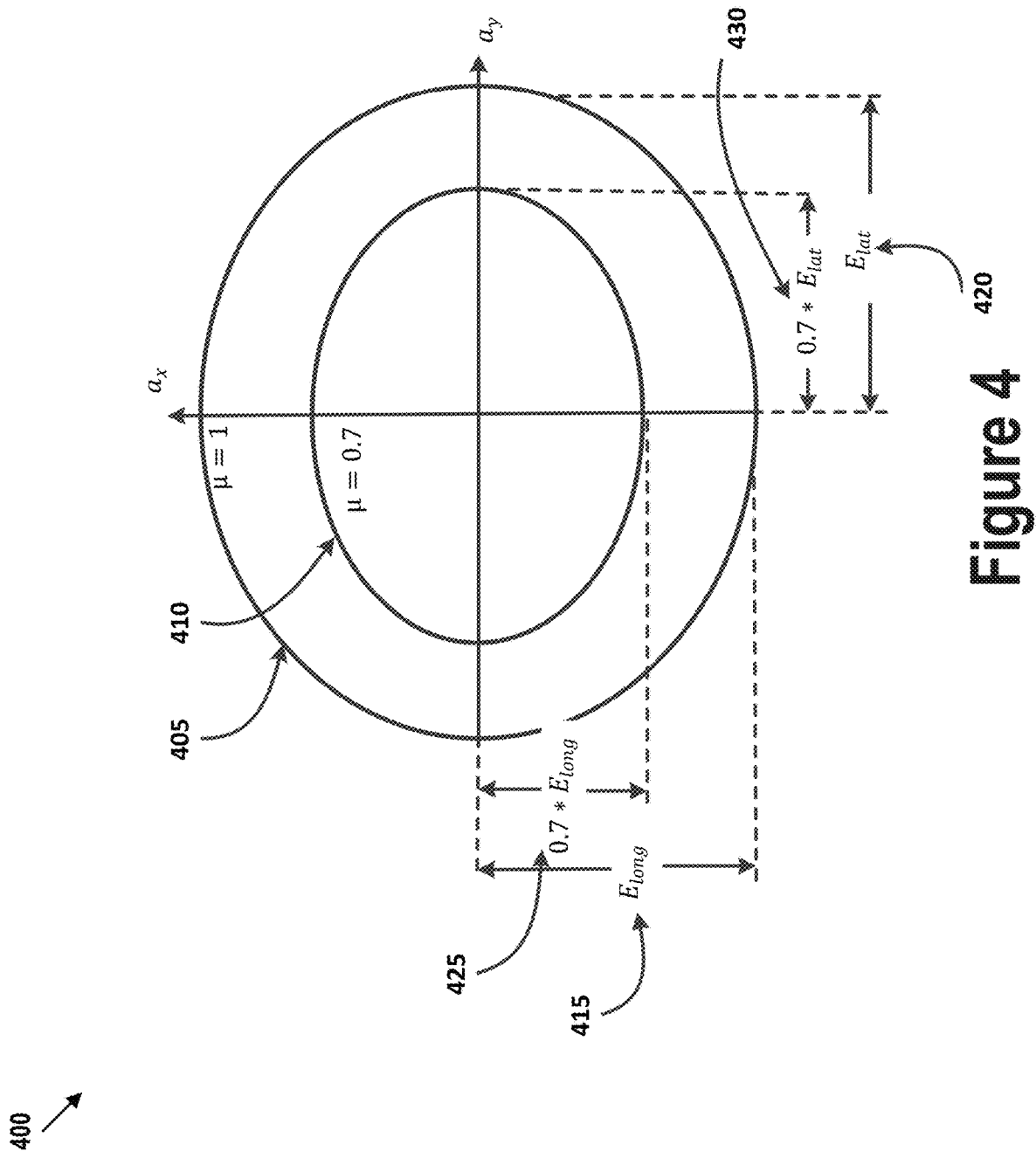
FIG. 4 illustrates an example operational response model for wet and dry roads, according to an example embodiment.

FIG. 4 illustrates an example operational response model 400 for wet and dry roads, according to an example embodiment. For example, a relationship between the road wetness (as measured by thickness of a water film on the road) and the friction coefficient between the tire and road surface may be determined. Such a relationship can provide granular details on road wetness detection, as opposed to a binary wet versus dry determination. From a perspective of motion control, a determination may be made whether an estimation regarding the road wetness is to be generated, and if an estimation is to be generated, then a level of refinement of such an estimation may be determined. Since a large portion of an impact of a wet road on motion control may be reflected as a reduced friction between the tire of the vehicle and the road, characterizing the relationship between the friction and the wetness may directly translate to motion control determinations on road wetness estimation. In particular, a trend of how friction changes as wetness increases may be highly relevant. For example, a continuous change may indicate a determination of a regression of road wetness, while a discrete change that includes multiple stages may indicate a requirement for multi-class classification, with each class corresponding to a group of road wetness conditions (e.g., road film thickness from 10 to 100 um) that corresponds to one stage in the change of friction.

In general, a tire-road friction coefficient, $\mu$, may be determined. The coefficient may not be a constant for a tire and road surface pair, even when other external conditions are the same, and may be based on an approximately hill-shaped function of tire slip, which generally impacts an area where a tire and road are in contact with each other. For a given vehicle configuration, control system 106 may be provided the corresponding dimensions for the ellipse (i.e. $E_{long}$ 415 and $E_{lat}$ 420) for dry road conditions where the coefficient of friction, or surface mu, $\mu$, is assumed to be 1. Ellipse 405 represents the elliptical model dimensions for $\mu=1$. A horizontal positive half-axis of ellipse 405 represents $E_{lat}$ 420, and a vertical positive half-axis of ellipse 405 represents $E_{long}$ 415. These dimensions may be identified for various values of surface $\mu$. In some embodiments, the dry road friction coefficient $\mu$ may be closer to the 0.8-0.9 range. Ellipse 410 represents the elliptical model dimensions for $\mu=0.7$. A horizontal positive half-axis of ellipse 410 represents $0.7*E_{lat}$ 430, and a vertical positive half-axis of ellipse 410 represents $0.7*E_{long}$ 425, corresponding to $\mu=0.7$. In some aspects, the ellipse parameters may be scaled up to what they would be for a surface mu of 1, or a surface mu value of 1 may be used as the default dry road coefficient of friction. The latter approach may imply that the surface mu value used by control system 106 may be an approximate proxy for the coefficient of friction, and may serve mainly as a scaling factor based on testing.

In some embodiments, the generating of the operational response model may be performed prior to a commencement of a trip. For example, computer system 112 may determine an initial operational response model prior to a commencement of a trip. In some embodiments, computer system 112 may update the initial operational response model based on a planned route for the trip. For example, data about the planned route may indicate puddles, banks, grades, and so forth, and computer system 112 may update the initial operational response model based on such information, prior to the commencement of the trip.

In order to adequately deal with positional variations in surface mu along the trajectory (e.g., in the presence of puddles), a value of surface mu may be associated with each baseline route calculation. The reason for having it in a baseline route calculation instead of an actual route calculation is because during geometry generation, actual routes may not have been determined. Since the trajectory can vary significantly from the baseline, there is the risk that an actual route calculation may in fact have a different surface mu value from its associated baseline route calculation. In some embodiments, a baseline route calculation may be associated with more conservative values of a surface mu based on the minimum value across an anticipated lane or road.

In some embodiments, computer system 112 may update the operational response model during the trip. For example, a value of surface mu may be added to the actual route calculation and then updated based on a location so that a more accurate elliptical model is utilized. Also, for example, puddle avoidance costs may be determined to minimize the likelihood of a variation of surface mu along an anticipated path. For example, an onboard weather module may provide some measure of surface friction based on a variety of onboard and/or offboard sources, and relay the data to control system 106 via messages.

In some embodiments, for a given route, there may be a plurality of operational response models at various scales and translations along a planned trajectory or route. For example, the operational response models can be based on expected future states of the vehicle and the road ahead. For example, different segments of the route can be mapped to different operational response models. For example, a route may comprise a first segment that includes mountainous terrain, a second segment that includes a long stretch of flat highway, and a third segment of city streets. Accordingly, each different segment can be mapped to a different operational response model.

As another example, different segments of the route may correspond to different conditions for road grade, bank, wind, and so forth. Such conditions may result in a longitudinal and/or lateral translation of an operational response model. For example, a first segment may correspond to a steep incline, and a second segment may correspond to high winds. Accordingly, each different segment can be mapped to a different operational response model.

In some embodiments, computer system 112 may update the operational response model for additional and/or alternative reasons, such as, for example, to limit control error, maintain driver controllability, and/or avoid triggering vehicle safety systems (e.g., anti-lock braking).

Comfort Scaling:

In some embodiments, computer system 112 may generate a comfort response model representing respective comfort operational constraints for the one or more operational parameters of the autonomous vehicle. The comfort values for the one or more operational parameters may be represented along respective coordinate axes of a second elliptical shape. The elliptical model may scale like other performance limits along with discomfort.

Figure 5:
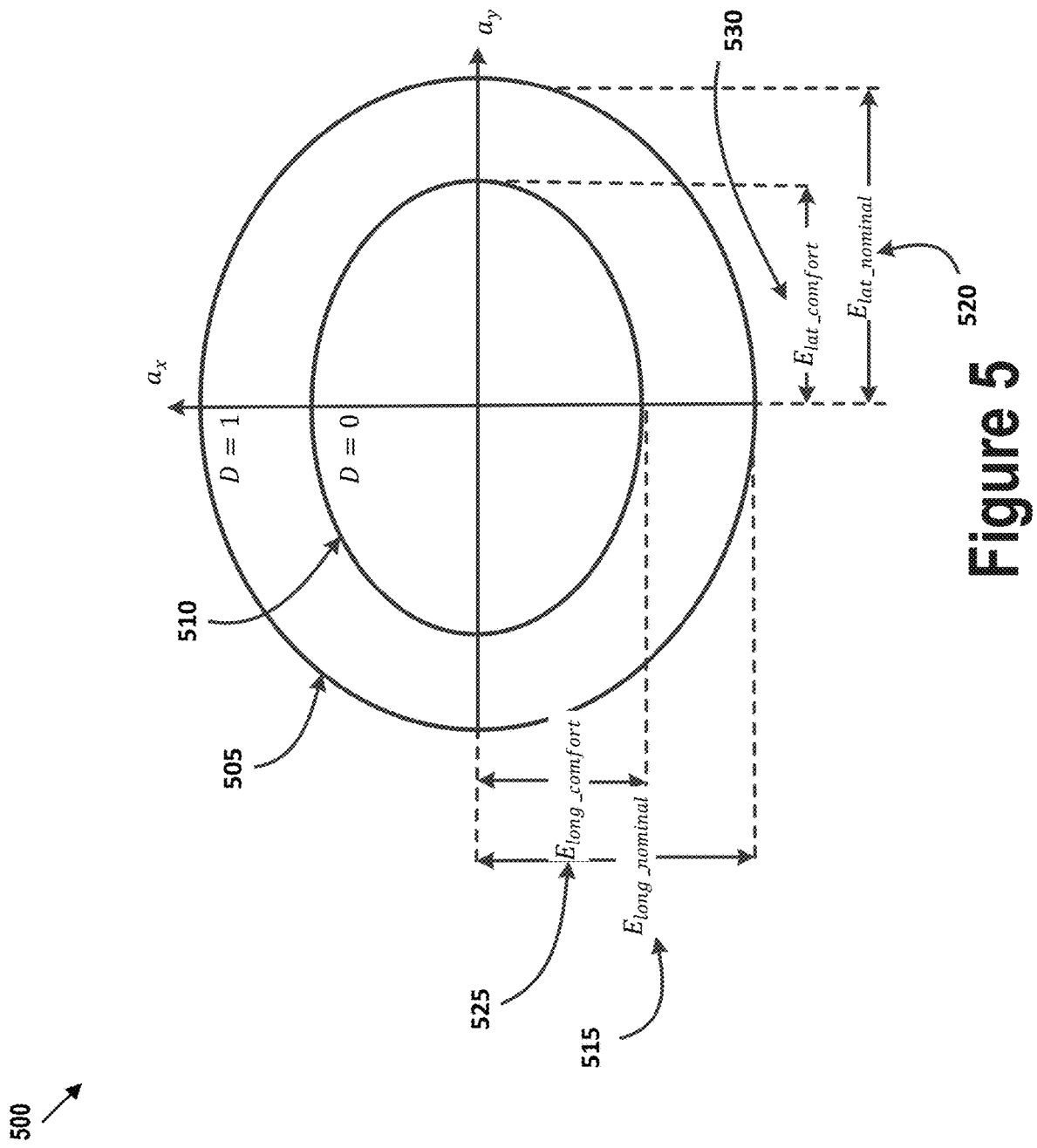
FIG. 5 illustrates an example comfort response model, according to an example embodiment.

FIG. 5 illustrates an example comfort response model, according to an example embodiment. For a given vehicle configuration, control system 106 may be provided the corresponding dimensions for the ellipse (i.e. $E_{long\text{-}nominal}$ 515 $E_{lat\text{-}nominal}$ 520) for road conditions where the coefficient of discomfort, D, is assumed to be 1. Ellipse 505 represents the elliptical model dimensions for D=1 (e.g., corresponding to a maximum discomfort). A horizontal positive half-axis of ellipse 505 represents $E_{lat\text{-}nominal}$ 520, and a vertical positive half-axis of ellipse 405 represents $E_{long\text{-}nominal}$ 515. These dimensions may be identified for various values of the coefficient of discomfort, D. Ellipse 510 represents the elliptical model dimensions for D=0. A horizontal positive half-axis of ellipse 510 represents $E_{lat\text{-}comfort}$ 530, and a vertical positive half-axis of ellipse 510 represents $E_{long\text{-}comfort}$ 525, corresponding to D=0 (e.g., corresponding to a maximum comfort).

As indicated, the nominal (or maximum discomfort) elliptical model 505 (for dry roads) may be represented by the parameters $E_{long\text{-}nominal}$ 515 and $E_{lat\text{-}nominal}$ 520, and may be based on the vehicle configuration. The dimensions of the comfort (or zero discomfort) elliptical model 510 may be represented by $E_{lat\text{-}comfort}$ 530 and $E_{long\text{-}comfort}$ 525, and may be defined in the parameters. In some embodiments, computer system 112 may modify the comfort response model based on the operational response model. Generally, the operational response model may be scaled by discomfort between these two ellipses 505 and 510 according to the following formulas:

$$E_{long}(X) = E_{long\text{-}comfort} * (1-X) + E_{long\text{-}nominal} * X \quad \text{(Eqn. 2)}$$

$$E_{lat}(X) = E_{lat\text{-}comfort} * (1-X) + E_{lat\text{-}nominal} * X \quad \text{(Eqn. 3)}$$

In some embodiments, one or more of nominal and comfort ellipses 505 and 510 may be additionally scaled by surface mu as described previously with reference to FIG. 4. If deemed necessary during development and evaluation, the manner in which the comfort ellipse is scaled by friction may be modified. Accordingly, with an introduction of the operational response model, longitudinal and lateral accelerations limits may be coupled, as well as be made dynamically position-dependent to be tuned to variations in surface mu.

In some embodiments, computer system 112 may cause an adjustment to the one or more operational parameters for the autonomous vehicle based at least in part on the operational response model. For example, computer system 112 may adjust a lateral acceleration, longitudinal acceleration, a jerk parameter, a jounce parameter, and so forth based on the operational response model. In some embodiments, the causing of the adjustment to the one or more operational parameters for the autonomous vehicle may involve generating the one or more instructions at the autonomous vehicle. For example, computer system 112 may generate instructions 115 that are transmitted to propulsion system 102 and/or control system 106 for execution.

FIGS. 6A-6C illustrate an example operational response model with propulsion and brake constraints, in accordance with example embodiments. The elliptical model introduces a new set of limits that bound the longitudinal and lateral acceleration limits due to friction.

In some embodiments, the operational constraints may be based on a performance constraint of an actuator of the autonomous vehicle. For example, control system 106 may utilize an actuator limit. The actuator limit is generally based on vehicle speed and road grade, and provides a maximum acceleration limit that represents the physical propulsion capabilities of an autonomous vehicle (e.g., vehicle 100). The value for an actuator limit may be chosen conservatively to account for traction and/or vehicle stability in a friction rectangle model (e.g., friction rectangle model 305). However, in a modified operational response model, such as, for example, an elliptical model, the actuator-based values may be represented by the nominal and comfort elliptical models. However, in some embodiments, the actuator limit may also vary with pitch. Accordingly, when actuator limits are accounted for, the operational response model may not need to account for pitch separately. In some embodiments however, computer system 112 may update the operational response model based on one or more of wind data, pitch data or roll data. For example, pitch data may be received from a pitch sensor, and roll data may be received from a roll sensor, and computer system 112 may update the operational response model based on the received data. Also, for example, wind data may be received from one or more sensors, or a weather database, and computer system 112 may update the operational response model based on the received wind data.

In some embodiments, the one or more operational parameters for the autonomous vehicle may include a propulsion constraint, a braking constraint, or both. FIG. 6A illustrates an ellipse model 600A with lateral acceleration limits indicated by an intersection of a boundary of the elliptical model 600A with the horizontal axis $a_y$, and with longitudinal acceleration limits indicated by an intersection of a boundary of the elliptical model 600A with the vertical axis $a_x$. FIG. 6B illustrates limits 600B corresponding to propulsion constraint 605 and braking constraint 610. FIG. 6C illustrates a new elliptical model 600C based on combining elliptical model 600A of FIG. 6A with propulsion constraint 605 and braking constraint 610 of FIG. 6B.

By incorporating values for the propulsion constraint 615 and braking constraint 620, elliptical model 600C is representative of more precise values for the actuator limit. In some embodiments, a position-dependent abstraction may be superimposed on top of operational limits. For example, given a distance along a fixed path, associated properties of the path at that position may be provided to control system 106 and the associated longitudinal acceleration limit may be obtained.

Some existing operational limit models only consider a position-dependent property based on pitch. However, curvature can be also used to compute lateral acceleration in order to provide an ellipse based longitudinal acceleration limit.

Figure 7:
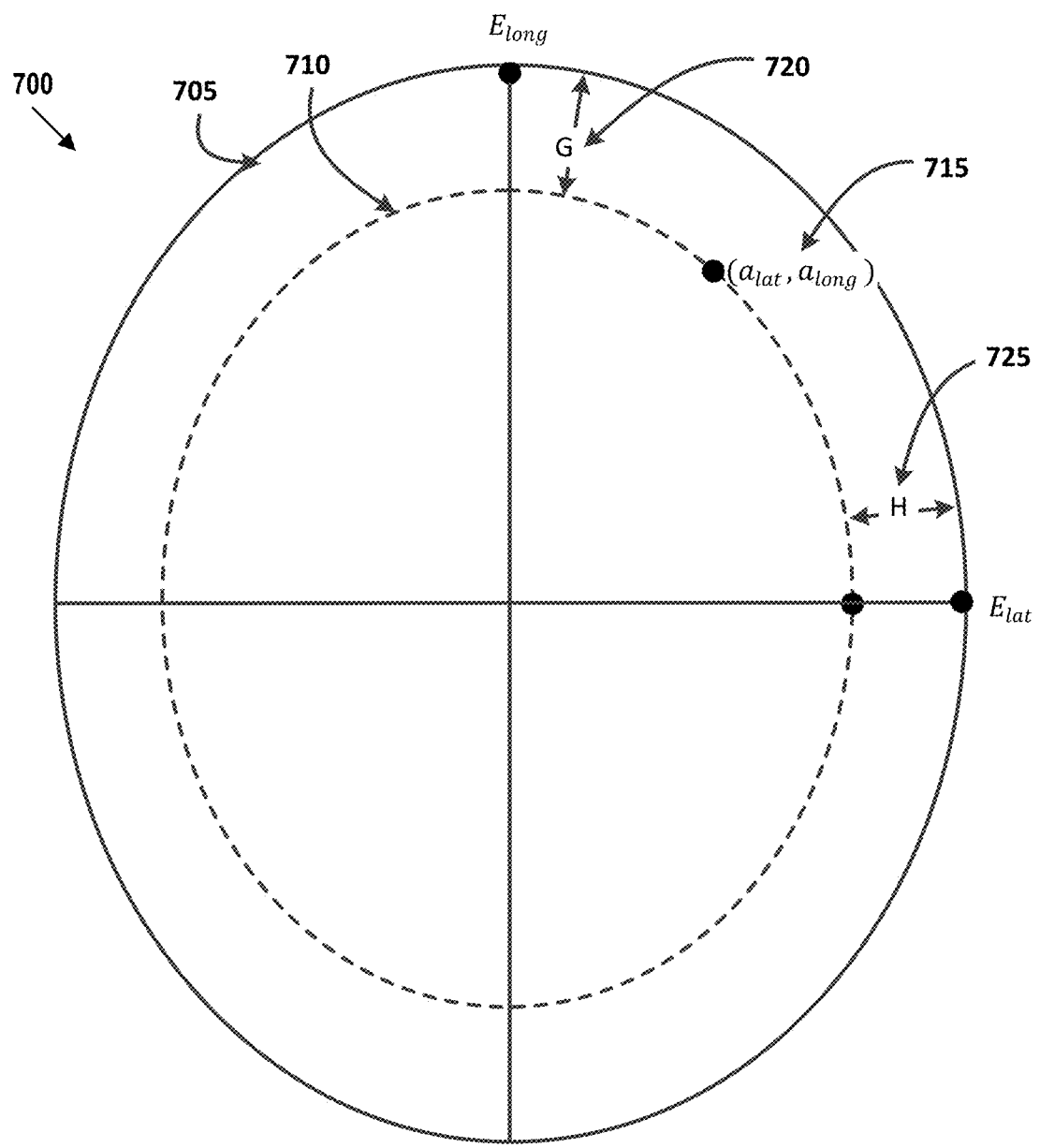
FIG. 7 illustrates an example operational response model in relation to operational limits, according to an example embodiment.

FIG. 7 illustrates an example operational response model 700 in relation to operational limits, according to an example embodiment. Operational response model 700 is depicted as elliptical model 705. Some assumptions of elliptical model 705 include that it is symmetric across longitudinal and lateral axes, and that the coefficient of surface friction is position-dependent. (e.g. puddles). The nominal (e.g., dry-road) value of the coefficient of surface friction mu is assumed to be 1. As previously described, $E_{lat}(x)$ and $E_{long}(x)$ define the half-width of the lateral and longitudinal axes, respectively, of the elliptical model 705 that defines the acceleration limits for traction. Both $E_{lat}(x)$ and $E_{long}(x)$ may be position-dependent since surface mu scales the elliptical model 705.

Point 715 represented as ($a_{lat}$, $a_{long}$) is defined by the speed state, s, and properties of the path at s.x, as determined below:

$$a_{long} = s.a \qquad (5)$$

$$a_{lat} = K(s.x) * s.v^2 \qquad \text{(Eqn. 4)}$$

where K(y) is the curvature at y. First distance 720, G, represents the shortest distance from ellipse 705 to an inner concentric ellipse 710 (shown as a dashed ellipse in FIG. 7) of equal aspect ratio near the longitudinal axis. Second distance 725, H, represents the shortest distance from ellipse 705 to an inner concentric ellipse 710 of equal aspect ratio near the lateral axis.

A point ($a_{lat}$, $a_{long}$) 715 on or inside the nominal ellipse 705 is defined by:

$$\frac{a_{lat}^2}{E_{lat}(x)^2} + \frac{a_{long}^2}{E_{long}(x)^2} \leq 1 \qquad \text{(Eqn. 5)}$$

Let $y = A*a_{lat}^2 + B*a_{long}^2 - 1$, where $$A = \frac{1}{E_{lat}(x)^2}, \text{ and } B = \frac{1}{E_{long}(x)^2},$$

then y represents "how far" the point ($a_{lat}$, $a_{long}$) 715 is from the nominal ellipse 705, with negative values being inside the ellipse and positive values being outside the ellipse. In some embodiments, control system 106 may adjust a trajectory of vehicle 100 by optimizing a plurality of cost functions. In some aspects, such an optimization may be performed based on an iterative Linear Quadratic Regulator (iLQR) optimization algorithm. For example, limits from an operational response model may serve as inputs to the iLQR algorithm. In some embodiments, the one or more mutually coupled operational parameters may be enforced as a high-cost barrier, where negative values of y do not impose a cost in the optimization algorithm, and a positive value imposes a cost that can cause an optimizer to modify the trajectory such that the operational limits are modified consistent with gains of other costs in the optimization algorithm. Generally, in iLQR optimization, the cost functions are assumed to be convex, therefore resulting in a positive semi-definite (PSD) Hessian matrix.

Note that a given value of y may correspond to different actual acceleration "distances" to the nearest point on the ellipse 705 depending on the circumferential location of ($a_{lat}$, $a_{long}$) 715. In some embodiments, y may represent how different the nominal ellipse 705 is from the concentric ellipse 710 of equal aspect ratio that ($a_{lat}$, $a_{tony}$) 715 is located on. All the points on the dashed ellipse represent one value of y and, in this example, because $E_{long} > E_{lat}$ it follows that |G|≥|H|. This difference supports the assumptions since (1) the ellipse should not be of a particularly extreme aspect ratio, and (b) both G and H are expected to have very small values by the time a barrier potential has a significant effect.

Similar to pitch, since surface mu may take any value on a path with respect to position x, convexity of the surface mu may not be a guaranteed factor. Accordingly, the Hessian matrix may not be positive semi-definite, and may therefore not be suitable for in the iLQR optimizer for convergence. Therefore, an approximated PSD Hessian matrix may be determined so as to enable the optimizer to converge. For example, $J^T J$ may be used to approximate the Hessian matrix to ensure PSD-ness. In particular, if:

$$f = \text{barrier}(y)$$

Then:

$$\frac{df}{d \text{ state}} == \text{barrier.gradient}(y)*J, J = \frac{dy}{d \text{ state}} \qquad \text{(Eqn. 6)}$$

$$\frac{ddf}{d \text{ stated state}} == \text{barrier.hess}(y)*J^T*J + \text{barrier.gradient}(y)*\frac{dJ}{d \text{ state}}$$

The second term, $$\text{barrier.gradient}(y) * \frac{dJ}{d \text{ state}},$$

may be ignored since $$\frac{dJ}{d \text{ state}}$$

is not guaranteed to be PSD, and its effect may be zero close to the transition point of the barrier (i.e., near y=0), since barrier.gradient(0)=0.

In some embodiments, an approximated PSD Hessian derivation may be determined. For example, for the ellipse derivatives, let $E_{LAT}$ denote the dry road lateral acceleration limit of the elliptical model, and let $E_{LONG}$ denote the dry road longitudinal acceleration limit of the elliptical model. Then, $$E_{lat} = E_{LAT} * \mu(x) \qquad \text{(Eqn. 7)}$$

where $E_{lat}$ is the lateral limit of the ellipse at position x. Also, $$E_{long} = E_{LONG} * \mu(x) \qquad \text{(Eqn. 8)}$$

where $E_{long}$ is the longitudinal limit of the ellipse at position x.

$$\frac{dE_{lat}}{dx} = E_{LAT} * \frac{d\mu}{dx} \text{ where } \frac{d\mu}{dx} \qquad \text{(Eqn. 9)}$$

denotes a path curvature at position x, and $$\frac{dE_{lat}}{dx} = 0, \frac{dE_{lat}}{da} = 0, \frac{dE_{long}}{dx} = E_{LONG} * \frac{d\mu}{dx}, \frac{dE_{long}}{dv} = 0, \qquad \text{(Eqn. 10)}$$

$$\text{and } \frac{dE_{long}}{da} = 0$$

The acceleration derivatives may be determined as:

$$\frac{da_{lat}}{dx} = \frac{dK(x)*v^2}{dx} = \frac{dk}{dx}*v^2 \qquad \text{(Eqn. 11)}$$

$$\frac{da_{lat}}{dv} = \frac{dK(x)*v^2}{dv} = 2*K(x)*v$$

and, where $$\frac{da_{lat}}{da} = 0, \frac{da_{long}}{dx} = 0, \frac{da_{long}}{dv} = 0, \frac{da_{long}}{da} = 1 \qquad \text{(Eqn. 12)}$$

The value of $$\frac{dy}{d\text{state}}$$

may be determined as:

$$y = \frac{a_{lat}^2}{E_{lat}(x)^2} + \frac{a_{long}^2}{E_{long}(x)^2} - 1; \qquad \text{(Eqn. 13)}$$

$$\frac{dy}{dx} = -2 * (E_{lat})^{-3} * \frac{dE_{lat}}{dx} * a_{lat}^2 +$$

$$2 * (E_{lat})^{-2} * a_{lat} * \frac{da_{lat}}{dx} - 2 * (E_{long})^{-3} * \frac{dE_{long}}{dx} * a_{long}^2 +$$

$$2 * (E_{lat})^{-2} * a_{lat} * \frac{da_{lat}}{dv} + 2 * (E_{long})^{-2} * a_{long} * \frac{da_{long}}{da}$$

The symmetric matrix $J^T J$ may be represented as:

$$\begin{bmatrix} & x & v & a & u \\ x & \frac{dy}{dx}*\frac{dy}{dx} & \frac{dy}{dx}*\frac{dy}{dv} & \frac{dy}{dx}*\frac{dy}{da} & 0 \\ v & \frac{dy}{dx}*\frac{dy}{dv} & \frac{dy}{dv}*\frac{dy}{dv} & \frac{dy}{dv}*\frac{dy}{da} & 0 \\ a & \frac{dy}{dx}*\frac{dy}{da} & \frac{dy}{dv}*\frac{dy}{da} & \frac{dy}{da}*\frac{dy}{da} & 0 \\ u & 0 & 0 & 0 & 0 \end{bmatrix} \qquad \text{(Eqn. 14)}$$

In some embodiments, an operational response model may include space-time limits. This can ensure that paths that are generated correspond to a feasible speed solution that does not violate limits provided by the operational response model.

In some embodiments, a barrier width effect may be incorporated into the operational response model. For example, an actuator-based barrier potential may have a width of 0.1. For a similar barrier width effect for the elliptical model, with a lateral limit of, say, 5.0 m/s/s, this can correspond to a friction-based barrier potential width of approximately 0.04. For example, values for a barrier may be determined as:

$$y = \left(\frac{5.0 - 0.1}{5.0}\right)^2 + \left(\frac{0}{a_{long}}\right)^2 - 1 = -0.0396 \qquad \text{(Eqn. 15)}$$

This may allow a speed optimizer to utilize a more lateral acceleration capability before incurring the barrier cost.

In some embodiments, the operational response model may be generated and/or stored at a remote computing system, such as a cloud server, and the causing of the adjustment to the one or more operational parameters for the autonomous vehicle may involve receiving the one or more instructions from the remote computing system. In some embodiments, computer system 112 may transmit the received instructions to propulsion system 102 and/or control system 106 for execution. In other embodiments, propulsion system 102 and/or control system 106 may receive the instructions directly from the remote computing system.

In some embodiments, the causing of the adjustment to the one or more operational parameters for the autonomous vehicle may involve generating a first set of the one or more instructions at the autonomous vehicle, and receiving a second set of the one or more instructions from a remote computing system.

As described herein, the operational response model may be based on at least one driving condition. In some embodiments, the at least one driving condition may include one or more of a road condition, a weather condition, a road surface friction, a road pitch, or a road grade.

In some embodiments, a first vehicle may receive the at least one driving condition from a second vehicle. For example, a second vehicle may be navigating a route and may determine that an accident has taken place, or road construction work is in progress, or may report a puddle, a sharp turn, and so forth. The second vehicle may convey such data to the first vehicle via a vehicle-to-vehicle (V2V) communication system. The first vehicle may then responsively update an operational response model based on the at least one driving condition received from the second vehicle.

In some embodiments, computer system 112 may determine an operational performance level of the autonomous vehicle. For example, computer system 112 may determine an actual performance level for the vehicle. Also, for example, computer system 112 may provide, via an interactive graphical user interface, a comparison of the operational performance level with a baseline performance level of the autonomous vehicle. For example, a remote operator may view the comparison and send instructions to update the operational response model. For example, if a comparison of the operational performance level with the baseline performance level indicates a large discrepancy (e.g., outside a threshold for risk), then the operational constraints for the operational response model may be set to lower limits so that the vehicle is operated within safety parameters.

In some embodiments, the autonomous vehicle may be operable to pull a trailer comprising a payload. Sensor data may indicate various characteristics of the payload, such as, for example, a size of the payload size, an arrangement of the payload on the trailer, a weight of the payload, and a center of gravity of the payload. As a vehicle is operated, changes to the various characteristics of the payload may prompt computer system to change one or more operational parameters. For example, a lateral and/or longitudinal acceleration parameter may need to be adjusted based on a change to a center of gravity of the payload caused by a bank or a grade in the road. Accordingly, computer system 112 may update the operational response model based on the one or more characteristics of the payload.

In some embodiments, a performance parameter of a trailer that carries the payload may change. For example, a suspension, brakes, tires, etc. of the trailer may change, causing a change to a performance parameter. Accordingly, computer system 112 may update the operational response model based on the performance parameter of the trailer.

IV. ADDITIONAL EXAMPLE OPERATIONS

Figure 8:
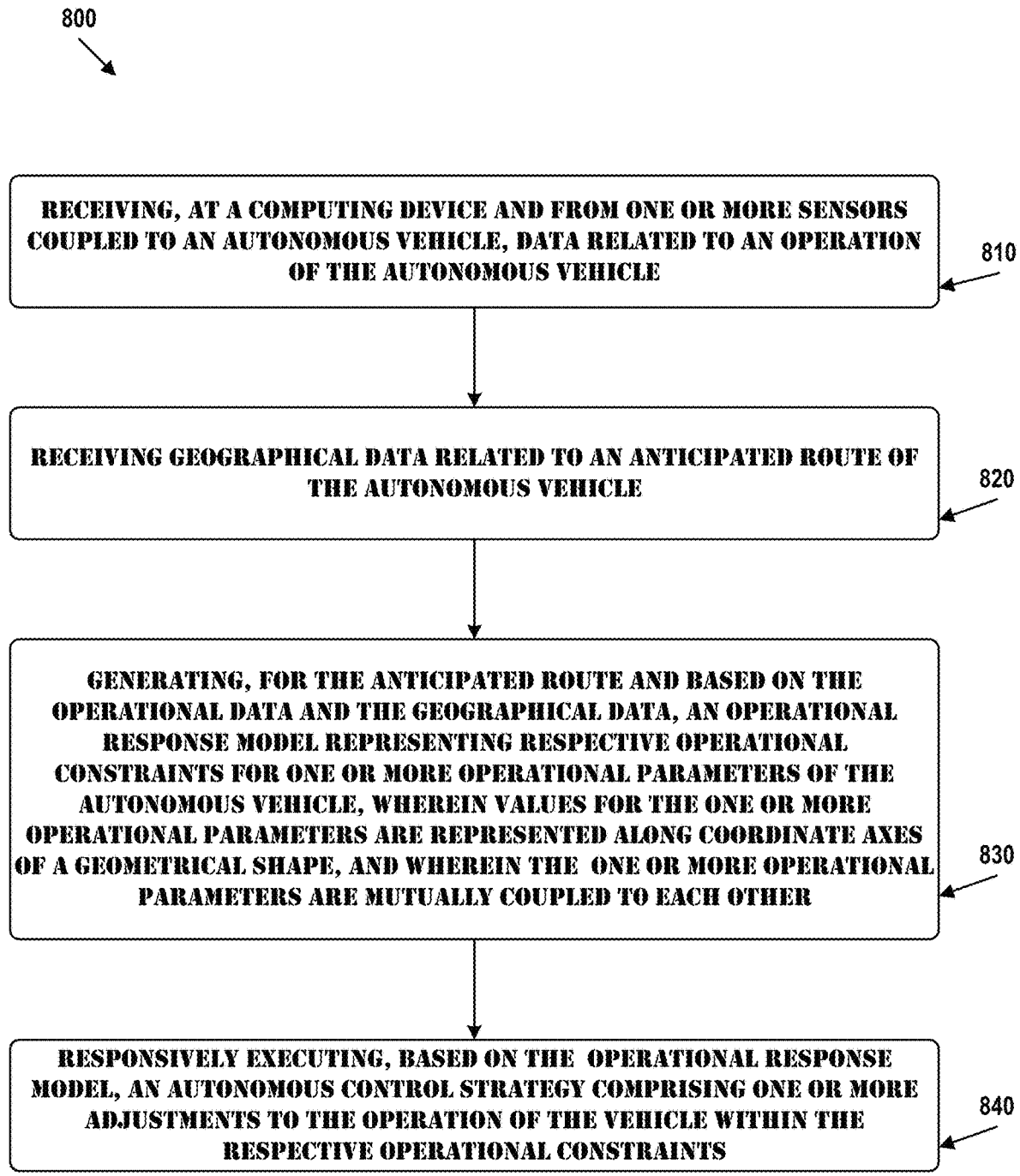
FIG. 8 illustrates a flow chart, in accordance with example embodiments.

FIG. 8 illustrates a flow chart 800, in accordance with example embodiments. The operations may be carried out by processor 113 of vehicle 100, the components thereof, and/or the circuitry associated therewith, among other possibilities. However, the operations can also be carried out by other types of devices or device subsystems. For example, the process could be carried out by a server device, an autonomous vehicle, and/or a robotic device.

The embodiments of FIG. 8 may be simplified by the removal of any one or more of the features shown therein. Further, these embodiments may be combined with features, aspects, and/or implementations of any of the previous figures or otherwise described herein.

Block 810 may involve receiving, at a computing device and from one or more sensors coupled to an autonomous vehicle, data related to an operation of the autonomous vehicle.

Block 820 may involve receiving geographical data related to an anticipated route of the autonomous vehicle.

Block 830 may involve generating, for the anticipated route and based on the operational data and the geographical data, an operational response model representing respective operational constraints for one or more operational parameters of the autonomous vehicle, wherein values for the one or more operational parameters are represented along coordinate axes of a geometrical shape, and wherein the one or more operational parameters are mutually coupled to each other.

Block 840 may involve responsively executing, based on the operational response model, an autonomous control strategy comprising one or more adjustments to the operation of the vehicle within the respective operational constraints.

In some embodiments, the geometrical shape may be an elliptical shape.

Some embodiments may involve receiving a first operational value of a first operational parameter of the one or more operational parameters. Such embodiments may also involve providing, based on the first operational value and the operational response model, a second operational value of a second operational parameter of the one or more operational parameters.

In some embodiments, the one or more operational parameters may include a longitudinal acceleration parameter and a lateral acceleration parameter.

In some embodiments, the one or more operational parameters may include a jerk parameter.

Some embodiments may involve adjusting the respective operational constraints based on a change to a given operational parameter of the one or more operational parameters.

In some embodiments, the generating of the operational response model may be performed prior to a commencement of a trip.

Some embodiments may involve updating the operational response model during a trip.

Some embodiments may involve generating a comfort response model representing respective comfort operational constraints for the one or more operational parameters of the autonomous vehicle, wherein comfort values for the one or more operational parameters are represented along respective coordinate axes of a second elliptical shape. In some embodiments, the comfort response model may be modified based on the operational response model.

Some embodiments may involve, based at least in part on the operational response model, causing an adjustment to the one or more operational parameters for the autonomous vehicle. In some embodiments, the causing of the adjustment to the one or more operational parameters for the autonomous vehicle may involve generating the one or more instructions at the autonomous vehicle. In some embodiments, the causing of the adjustment to the one or more operational parameters for the autonomous vehicle may involve receiving the one or more instructions from a remote computing system. In some embodiments, the causing of the adjustment to the one or more operational parameters for the autonomous vehicle may generating a first set of the one or more instructions at the autonomous vehicle. Such embodiments may involve receiving a second set of the one or more instructions from a remote computing system.

In some embodiments, the operational response model may be based on at least one driving condition. In some embodiments, the at least one driving condition may include one or more of: a road condition, a weather condition, a road surface friction, a road pitch, a road bank, or a road grade.

Some embodiments may involve receiving the at least one driving condition from a second vehicle different from the autonomous vehicle. Such embodiments may involve updating the operational response model based on the received at least one driving condition.

Some embodiments may involve determining an operational performance level of the autonomous vehicle. Such embodiments may involve providing, via an interactive graphical user interface, a comparison of the operational performance level with a baseline performance level of the autonomous vehicle.

In some embodiments, the autonomous vehicle may be operable to pull a trailer comprising a payload, and such embodiments may involve updating the operational response model based on one or more characteristics of the payload, wherein the one or more characteristics of the payload comprises a size of the payload size, an arrangement of the payload on the trailer, a weight of the payload, and a center of gravity of the payload.

Some embodiments may involve updating the operational response model based on a performance parameter of the trailer.

In some embodiments, the operational constraints may be based on a performance constraint of an actuator of the autonomous vehicle.

Some embodiments may involve updating the operational response model based on one or more of: wind data, pitch data or roll data.

In some embodiments, the one or more operational parameters for the autonomous vehicle may include a propulsion constraint, a braking constraint, or both.

Some embodiments may involve triggering, based on the operational response model, a change to a driving mode of the autonomous vehicle.

V. EXAMPLE COMPUTER READABLE MEDIA

Figure 9:
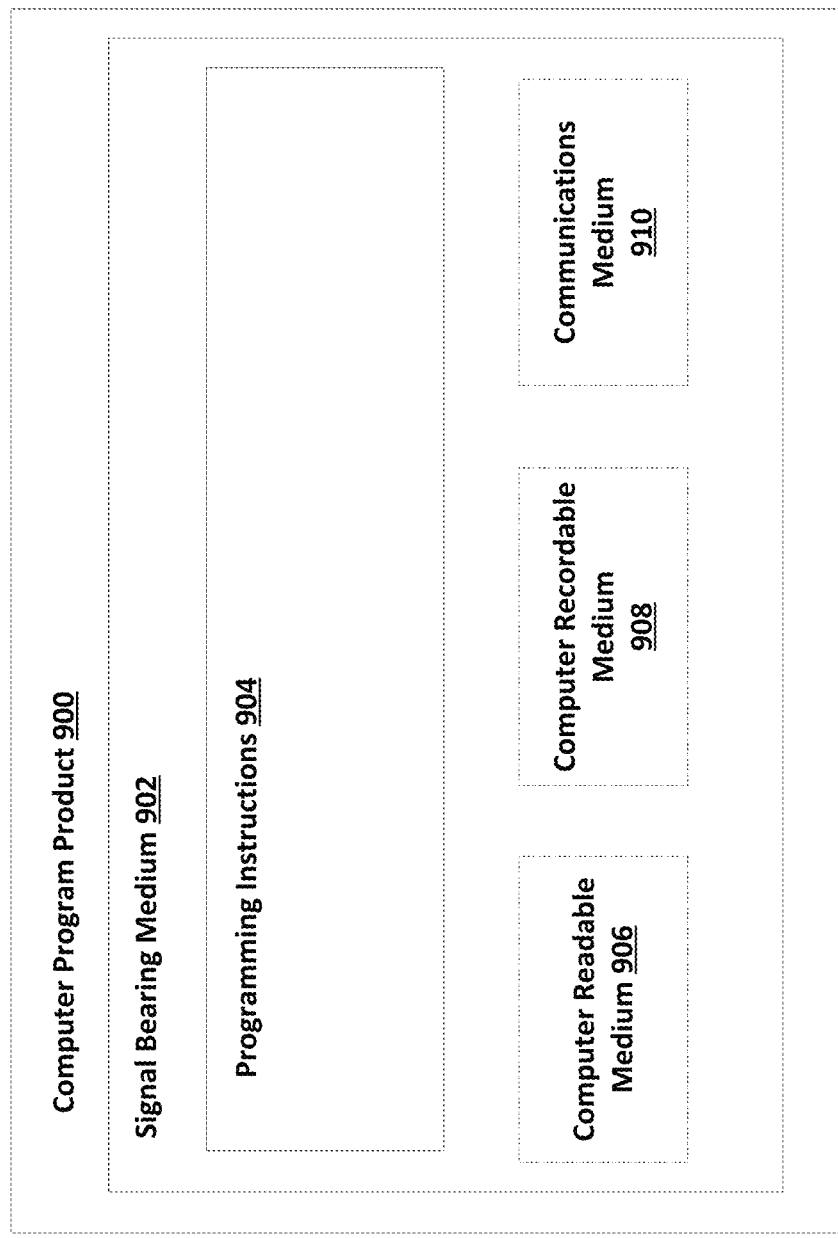
FIG. 9 depicts an example computer readable medium, in accordance with example embodiments.

FIG. 9 depicts an example computer readable medium, in accordance with example embodiments. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., described in flow charts 500, 600, etc.) may be implemented by computer program instructions encoded on a computer readable storage media in a machine-readable format, or on other media or articles of manufacture (e.g., instructions 115 of the vehicle 100, instructions 412 of the computing device 404, etc.). FIG. 9 is a schematic illustrating a conceptual partial view of an example computer program product that includes a computer program for executing a computer process on a computing device, such as on a radar planning system, arranged according to at least some embodiments disclosed herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 may be a computer-readable medium 906, such as, but not limited to, a hard disk drive, a Compact Disc (CD), a Digital Video Disk (DVD), a digital tape, memory, etc. In some implementations, the signal bearing medium 902 may be a computer recordable medium 908, such as, but not limited to, memory, read/write (R/W) CDs, R/W DVDs, etc. In some implementations, the signal bearing medium 902 may be a communication medium 910 (e.g., a fiber optic cable, a waveguide, a wired communications link, etc.). Thus, for example, the signal bearing medium 902 may be conveyed by a wireless form of the communications medium 910.

The one or more programming instructions 904 may be, for example, computer executable and/or logic implemented instructions. In some examples, a computing device may be configured to provide various operations, functions, or actions in response to the programming instructions 904 conveyed to the computing device by one or more of the computer readable medium 906, the computer recordable medium 908, and/or the communications medium 910.

The computer readable medium 906 may also be distributed among multiple data storage elements, which could be remote from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remote computer system, such as a server, or a distributed cloud computing network.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for the purpose of illustration and are not intended to be limiting, with the true scope being indicated by the following claims.

What is claimed is:

1. A system comprising:
   an autonomous vehicle;
   one or more sensors coupled to the autonomous vehicle; and
   a computing device configured to:
      receive, from the one or more sensors, operational data related to an operation of the autonomous vehicle;
      receive geographical data related to an anticipated route of the autonomous vehicle;
      receive wind data;
      generate, for the anticipated route and based on the operational data, the geographical data, and the wind data, an operational response model representing respective operational constraints for N operational parameters of the autonomous vehicle, wherein N>2, wherein values for the N operational parameters are represented along coordinate axes of an N-dimensional geometrical shape, and wherein the N operational parameters are mutually coupled to each other;
      responsively execute, based on the operational response model, an autonomous control strategy comprising one or more adjustments to the operation of the vehicle within the respective operational constraints; and
      trigger, based on the operational response model, a change to an autonomous driving mode of the autonomous vehicle, wherein the autonomous driving mode is a semi or fully-autonomous driving mode.

2. The system of claim 1, wherein the computing device is configured to:
   receive a first operational value of a first operational parameter of the N operational parameters; and
   provide, based on the first operational value and the operational response model, a second operational value of a second operational parameter of the N operational parameters.

3. The system of claim 1, wherein the N operational parameters comprise a longitudinal acceleration parameter and a lateral acceleration parameter.

4. The system of claim 3, wherein the N operational parameters comprise a jerk parameter.

5. The system of claim 1, wherein the computing device is configured to:
   adjust the respective operational constraints based on a change to a given operational parameter of the N operational parameters.

6. The system of claim 1, wherein the generating of the operational response model is performed prior to a commencement of a trip, and wherein the computing device is further configured to update the operational response model during a trip.

7. The system of claim 1, wherein the computing device is further configured to:
   generate a comfort response model representing respective comfort operational constraints for the N operational parameters of the autonomous vehicle, wherein comfort values for the N operational parameters are represented along respective coordinate axes of a second N-dimensional geometric shape.

8. The system of claim 7, wherein the comfort response model is modified based on the operational response model.

9. The system of claim 1, wherein the computing device is further configured to:
   based at least in part on the operational response model, cause an adjustment to the N operational parameters for the autonomous vehicle.

10. The system of claim 9, wherein the causing of the adjustment to the N operational parameters for the autonomous vehicle comprises:
    generating the one or more instructions at the autonomous vehicle.

11. The system of claim 9, wherein the causing of the adjustment to the N operational parameters for the autonomous vehicle comprises:
    receiving the one or more instructions from a remote computing system.

12. The system of claim 9, wherein the causing of the adjustment to the N operational parameters for the autonomous vehicle comprises:
    generating a first set of the one or more instructions at the autonomous vehicle; and
    receiving a second set of the one or more instructions from a remote computing system.

13. The system of claim 1, wherein the operational response model is based on at least one driving condition.

14. The system of claim 13, wherein the at least one driving condition comprises one or more of: a road condition, a weather condition, a road surface friction, a road pitch, or a road grade.

15. The system of claim 13, wherein the computing device is further configured to:
    receive the at least one driving condition from a second vehicle different from the autonomous vehicle; and
    update the operational response model based on the received at least one driving condition.

16. The system of claim 1, wherein the computing device is further configured to:
    determine an operational performance level of the autonomous vehicle; and
    provide, via an interactive graphical user interface, a comparison of the operational performance level with a baseline performance level of the autonomous vehicle.

17. The system of claim 1, wherein the autonomous vehicle is operable to pull a trailer comprising a payload, and wherein the computing device is further configured to:
    update the operational response model based on one or more characteristics of the payload, wherein the one or more characteristics of the payload comprises a size of the payload size, an arrangement of the payload on the trailer, a weight of the payload, and a center of gravity of the payload.

18. The system of claim 17, wherein the computing device is further configured to:
    update the operational response model based on a performance parameter of the trailer.

19. The system of claim 1, wherein the operational constraints are based on a performance constraint of an actuator of the autonomous vehicle.

20. The system of claim 1, wherein the one or more sensors coupled to the autonomous vehicle comprise a pitch sensor and a roll sensor, wherein the computing device is further configured to:
    update the operational response model based on one or more of: pitch data received from the pitch sensor or roll data received from the roll sensor.

21. The system of claim 1, wherein the N operational parameters for the autonomous vehicle comprise a propulsion constraint, a braking constraint, or both.

22. The system of claim 1, wherein the change to the autonomous driving mode comprises a change from a Level 5 autonomous driving mode to a Level 3 autonomous driving mode.

23. An autonomous vehicle, comprising:

one or more sensors coupled to the autonomous vehicle; and a computing device configured to (i) receive, from the one or more sensors, operational data related to an operation of the autonomous vehicle, (ii) receive geographical data related to an anticipated route of the autonomous vehicle, (iii) receive wind data, (iv) generate, for the anticipated route and based on the operational data, and the geographical data, and the wind data, an operational response model representing respective operational constraints for N operational parameters of the autonomous vehicle, wherein N>2, wherein values for the N operational parameters are represented along coordinate axes of an N-dimensional geometrical shape, and wherein the N operational parameters are mutually coupled to each other, (v) responsively execute, based on the operational response model, an autonomous control strategy comprising one or more adjustments to the operation of the vehicle within the respective operational constraints, and (vi) trigger, based on the operational response model, a change to an autonomous driving mode of the autonomous vehicle, wherein the autonomous driving mode is a semi or fully-autonomous driving mode.

24. A method, comprising:

receiving, at a computing device and from one or more sensors coupled to an autonomous vehicle, data related to an operation of the autonomous vehicle;

receiving geographical data related to an anticipated route of the autonomous vehicle;

receiving wind data;

generating, for the anticipated route and based on the operational data, and the geographical data, and the wind data, an operational response model representing respective operational constraints for N operational parameters of the autonomous vehicle, wherein N>2, wherein values for the N operational parameters are represented along coordinate axes of an N-dimensional geometrical shape, and wherein the N operational parameters are mutually coupled to each other;

responsively executing, based on the operational response model, an autonomous control strategy comprising one or more adjustments to the operation of the vehicle within the respective operational constraints; and trigger, based on the operational response model, a change to an autonomous driving mode of the autonomous vehicle, wherein the autonomous driving mode is a semi or fully-autonomous driving mode.

25. The system of claim 4, wherein the N operational parameters comprise a jounce parameter.

26. The system of claim 1, wherein the computing device is configured to receive the wind data from at least one of:

the one or more sensors coupled to the autonomous vehicle; or a weather database.

\* \* \* \* \*